\
UNITED STATES PATENT OFFICE.

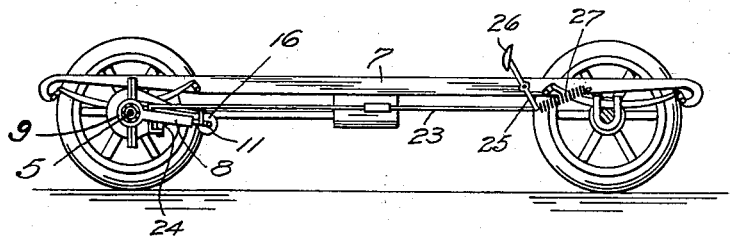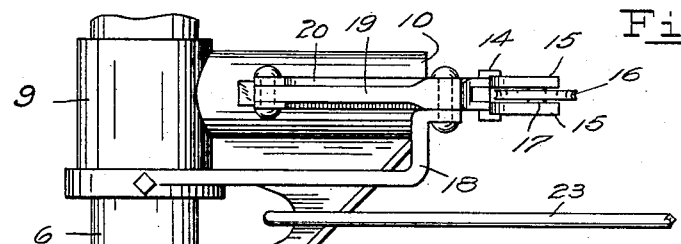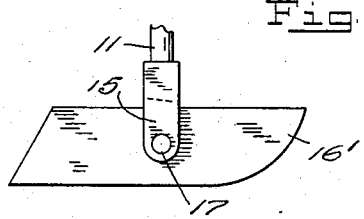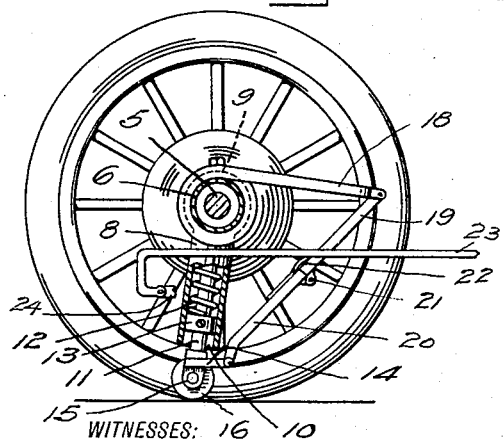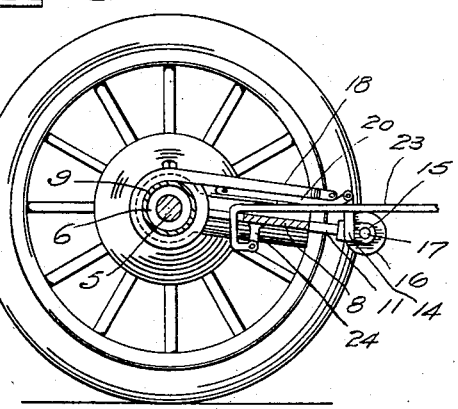

CHARLES P. ROSS, OF SEATTLE, WASHINGTON.

ANTISKID DEVICE FOR AUTOMOBILES.

1,171,658.  Specification of Letters Patent.  Patented Feb. 15, 1916.

Application filed December 17, 1914. Serial No. 877,676.

*To all whom it may concern:*

Be it known that I, CHARLES P. ROSS, a citizen of the United States, residing at Seattle, in the county of King and State of Washington, have invented certain new and useful Improvements in Antiskid Devices for Automobiles, of which the following is a specification.

This invention relates to automobiles, or the like; and its object is the provision of efficient and conveniently operated devices whereby the so-called "skidding" movements of a vehicle may be obviated, and affording means whereby the speed of the vehicle may be checked or overcome to stop the same in an emergency.

The invention consists in the combination of such devices, the construction and operation of which will be hereinafter described and illustrated in the accompanying drawings.

In the drawings, Figure 1 is a longitudinal sectional view of a portion of an automobile with devices embodying my invention applied thereto. Fig. 2 is a partial plan view of the same. Fig. 3 is a fragmentary longitudinal vertical section with the devices in operative positions. Fig. 4 is a similar view with the devices shown in inoperative positions. Fig. 5 is a detail view illustrating a modified form of the ground-engaging element.

The reference numeral 5 designates the rear axle of an automobile inclosed, as usual, by a tubular casing 6.

7 is a longitudinal member upon which is supported the vehicle body.

According to the present invention, I provide a frame 8 having at one end sleeve elements 9 to receive the casing 6 and whereby the frame is connected for swinging movements thereto. Provided in said frame and extending radially or nearly so from the axis of said sleeve elements is a socket 10 to accommodate a bar 11. Said bar is yieldingly pushed outwardly from the socket 10 by means of a spring 12 interposed between the inner end of the socket and a collar 13 provided on the bar. The outer end of bar 11 is bifurcated and intermediate the bifurcations 15 is provided a wheel 16, or a shoe 16[1] (Fig. 5) mounted upon an axle or pin 17 which is journaled in the bifurcations 15 of the bar.

18 is a bracket which is rigidly secured to the casing 6 and extends for a distance in front of the same. Connecting the forward end of the bracket with a yoke 14 which is secured to the protruding end of bar 11 is a foldable tie-rod comprising two links 19 and 20 which are connected by a rule joint 21. 22 is a leaf spring secured to one of said links and extending over the adjacent end of the other with a tendency to prevent the links being brought into alinement.

23 is a pull-rod connecting a post 24 of the frame 8 and an arm 25 of a pedal lever 26. A spring 27 is connected to the lever-arm 25 and tends to pull the rod 23 forward and yieldingly hold the frame 8 and the associated parts in their inoperative positions, as shown in Figs. 1 and 4.

The wheel 16 is maintained to have its axis parallel to the axle 5 so that the wheel, when tracking upon the ground, will rotate during the forward or rearward travel of the vehicle. During any sidewise or "skidding" movement of the vehicle, the wheel rim will dig into the ground and thereupon act to overcome such skidding.

To operate the device, the operator with his foot pushes against the lever 26 resulting in the rearward swing of the lever-arm 25 in opposition to the spring 27. The bar 23 is thus pushed rearwardly to swing the frame 8 from the position in which it is shown in Fig. 4 to that in which it is represented in Fig. 3 or, at least, until the wheel 16 encounters the ground, whereupon the forward travel of the car will render the ground capable of thrusting the frame rearwardly until it is arrested by the link connections 19—20. When in inoperative position the wheel 16 is held through the office of the spring 12 at a distance from the axle 5 greater than the height of the latter above the ground, and when the wheel 16 is moved through the space below the axle, the spring 12 is compressed to allow the bar 11 to recede. The spring being thus compressed exercises a considerable lifting force upon the axle with a consequent reduction in the load upon the traction wheels of the automobile.

By connecting the links 19 and 20 with the bar 11 and the bracket 18 at the front of the pivotal connection of the frame 8, the links not only serve to limit the rearward swing of the frame, but also limit the outward movement of the bar with respect to the frame-socket 10.

Having described my invention, what I claim, is—

1. In a device of the class described, the combination with a vehicle, of a chambered frame connected for swinging movements to the vehicle, a bar extending into the chamber of said frame, a ground-engaging element carried by the outer end of said bar, a spring tending to push the bar outwardly with respect to the frame chamber, means connected with said bar and a rigid support for limiting the rearward swinging movements of the frame and the extent of the bar's projection from the latter, means for yieldingly holding said frame in inoperative position, and manually-controlled means for causing said frame to be swung into position to render said element operative.

2. In a device of the class described, the combination with an automobile, of a frame connected to the rear end of said automobile, a bar connected to said frame for relative longitudinal movements, a ground-engaging element carried by said bar, a spring tending to push the bar outwardly with respect to the frame, means connected with said bar to limit the rearward swinging movements of the frame and the extent of the bar's projection therefrom, and means connected to said frame whereby the same is moved to carry said element into or out of operative positions.

Signed at Seattle, Wash., this 30th day of November, 1914.

CHARLES P. ROSS.

Witnesses:
E. PETERSON,
HORACE BARNES.

Copies of this patent may be obtained for five cents each, by addressing the "Commissioner of Patents, Washington, D. C."